United States Patent [19]

Cheron et al.

[11] Patent Number: 5,405,185
[45] Date of Patent: Apr. 11, 1995

[54] TILT AND SLIDE SUN-ROOF

[75] Inventors: Christian Cheron, Angers; Francois de Gaillard, Mouilleron en Pareds; Pierre Thierry, Cholet, all of France

[73] Assignee: Webasto-Heuliez, Les Chatelliers-Chateaumur, France

[21] Appl. No.: 125,247

[22] Filed: Sep. 23, 1993

[30] Foreign Application Priority Data

Sep. 24, 1992 [FR] France .................. 92 11395

[51] Int. Cl.$^6$ ............................................. B60J 7/043
[52] U.S. Cl. ................................ 296/223; 296/216; 296/220; 296/224
[58] Field of Search .............. 296/216, 220, 221, 222, 296/223, 224

[56] References Cited

U.S. PATENT DOCUMENTS

| | | | |
|---|---|---|---|
| 4,403,805 | 9/1983 | Strem, Jr. et al. | 296/223 X |
| 5,066,068 | 11/1991 | Suzuki et al. | 296/223 X |

FOREIGN PATENT DOCUMENTS

| | | |
|---|---|---|
| 2525159 | 4/1983 | France . |
| 3444606 | 12/1984 | Germany . |
| 3515321 | 4/1985 | Germany . |
| 3603314 | 2/1986 | Germany . |
| 4001759 | 1/1990 | Germany . |
| 4419 | 1/1985 | Japan .................. 296/222 |
| 2122250 | 4/1983 | United Kingdom . |
| 2122552 | 4/1983 | United Kingdom . |

Primary Examiner—Dennis H. Pedder
Attorney, Agent, or Firm—Banner, Birch, McKie & Beckett

[57] ABSTRACT

A tilt and slide sun-roof comprises a mobile panel on each side of which is a sliding member comprising a first mobile panel pivot pin, a rail, a guide carriage and a guide fastened to the mobile panel. The guide carriage is movable in translation relative to said rail to tilt the mobile panel by rotating it about the first pivot pin and then sliding it. The guide carriage comprises a pivot pin so that the mobile panel is tilted by rotating the guide carriage about the second pivot pin during translatory movement of the guide carriage towards the rear of the mobile panel. It includes an arrangement for preventing rotation of the guide carriage during return movement of the guide carriage towards the front.

11 Claims, 2 Drawing Sheets

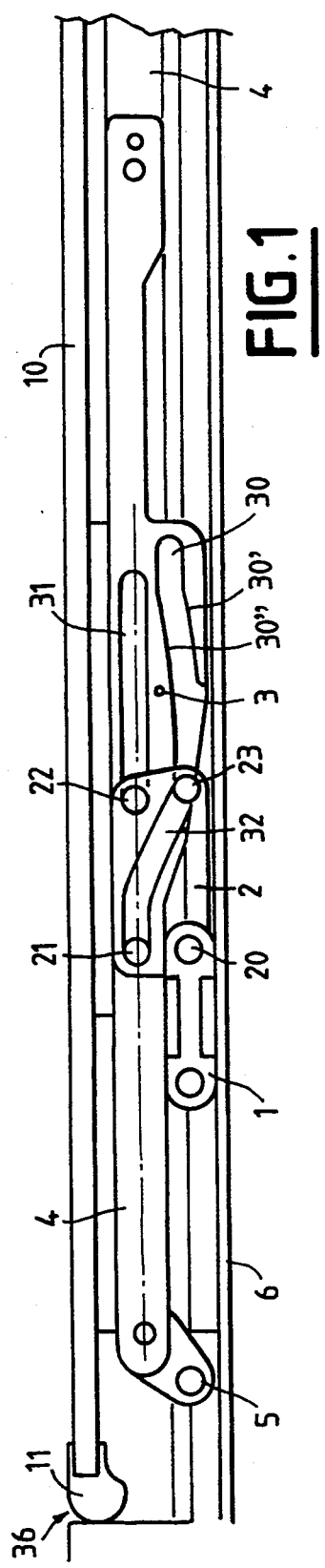
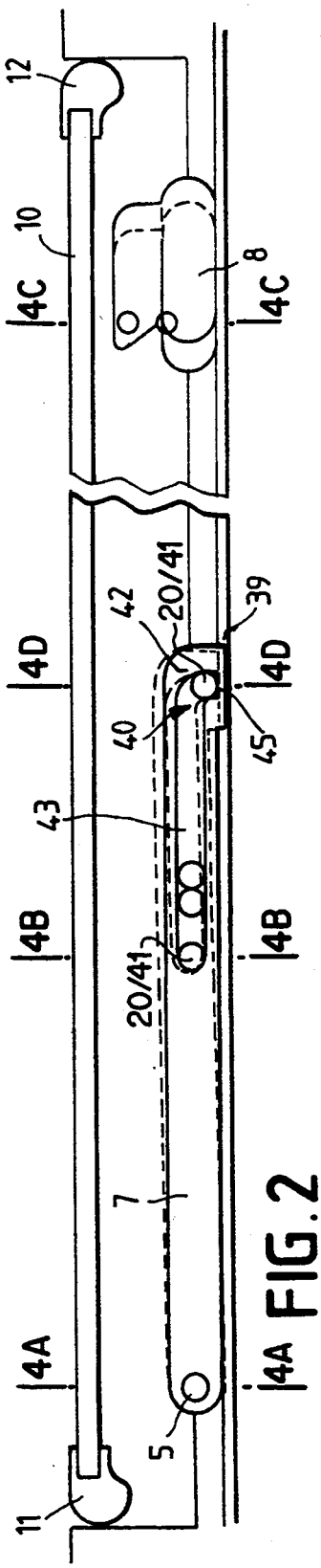
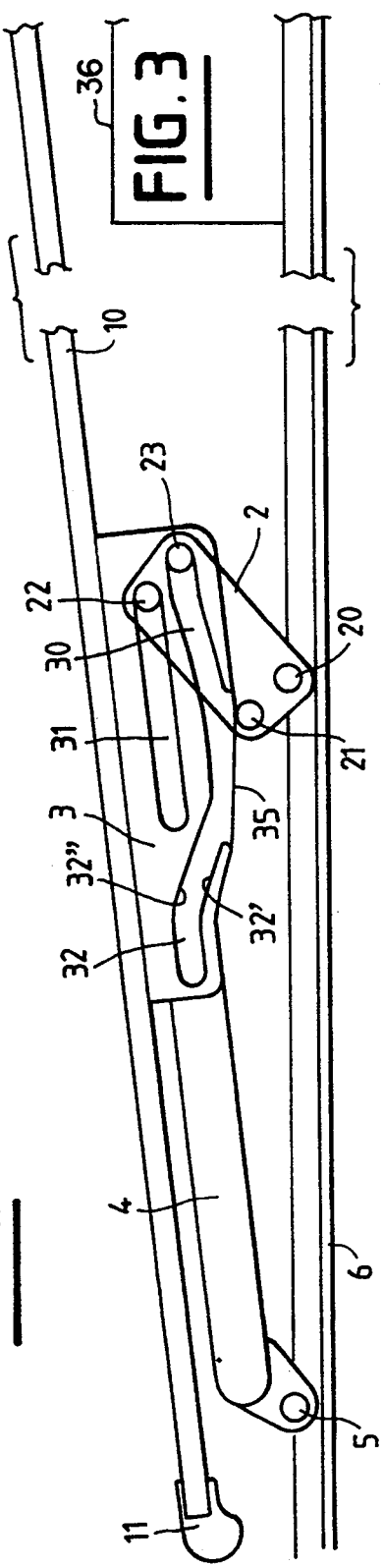

TILT AND SLIDE SUN-ROOF

BACKGROUND OF THE INVENTION

1. Field of the Invention

The present invention concerns a tilt and slide sunroof comprising a mobile panel on each side of which is a sliding member comprising a first mobile panel pivot pin, a rail, a guide carriage and a guide fastened to the mobile panel and in which a sliding member on each side of the mobile panel is situated at a forward part of the mobile panel and is movable in translation relative to said rail and a guide carriage has pegs cooperating with respective guide tracks in said guide, the guide carriage being movable in translation relative to said rail to tilt the mobile panel by rotating it about the first pivot pin and then sliding it by movement of the guide carriage towards the rear of the mobile panel and vice versa on return movement of the guide carriage towards the front of the mobile panel.

2. Description of the Prior Art

A sun-roof of this kind is known from French patent application FR-2 525 159 (WEBASTO WERKE). In this application the two guide carriages are movable only in translation and the mobile panel cooperates with two lifting levers articulated to the mobile panel level and to the guide rail. When the carriages are moved towards the front from an open position of the mobile panel the lifting levers are held in place by a spring opposing relative movement between these two members. A device of this kind requires a large number of component parts to fulfil its mechanical functions and its overall vertical dimension is large, in particular because of the large number of articulations required.

The present invention concerns a tilt and slide sun-roof of the aforementioned type in which these functions can be achieved with a reduced number of components and which also has a small overall vertical size.

SUMMARY OF THE INVENTION

The invention consists in a tilt and slide sun-roof comprising a mobile panel on each side of which is a sliding member comprising a first mobile panel pivot pin, a rail, a guide carriage and guide fastened to the mobile panel and in which a sliding member on each side of the mobile panel is situated at a forward part of the mobile panel and is movable in translation relative to said rail and a guide carriage has pegs cooperating with respective guide tracks in said guide, the guide carriage being movable in translation relative to said rail to tilt the mobile panel by rotating it about the first pivot pin and then sliding it by movement of the guide carriage towards the rear of the mobile panel and vice versa on return movement of the guide carriage towards the front of the mobile panel, in which sun-roof a guide carriage comprises a second pivot pin about which it can rotate so that said mobile panel is tilted by rotating said guide carriage about said second pivot pin during translatory movement of said guide carriage towards the rear of said mobile panel, said sun-roof further comprising on one side at least of said mobile panel means for preventing rotation of said guide carriage during return movement of said guide carriage towards the front.

Said rotation preventing means may comprise on one side at least of said mobile panel a locking member operated by displacement of said guide carriage and having a first position in which it prevents sliding of said mobile panel and a second position in which it prevents rotation on of said guide carriage, transition from said first to said second position occurring during translatory movement of said guide carriage towards the rear substantially at the end of rotation of said guide carriage to tilt said mobile panel and transition from said second to said third position occurring during translatory movement of said guide carriage towards the front substantially at the end of the forward travel of said mobile panel.

The guide carriage advantageously comprises a first peg adjacent said second pivot pin and second and third pegs spaced from said second pivot pin, said guide has first, second and third guide tracks, said first peg cooperating with said first guide track which is curved to cause said rotation of said guide carriage and said second and third pegs cooperating with said second and third guide tracks the profile of which is adapted to tilt and close said mobile panel in conjunction with said rotation of said Guide carriage, which is produced by translatory movement of the mobile carriage respectively towards the rear and towards the front. This arrangement enables rotation of the guide carriage by means of a lever effect to reduce the thickness of the carriage.

The third guide track is advantageously superposed on the second guide track.

In a preferred embodiment of the invention said third guide track has a lower edge which extends forwardly over a distance less than its upper edge so that said third peg is guided only by said upper edge during part of the travel of said guide carriage and/or said first guide track has a lower edge extending rearwardly over a shorter distance than its upper edge so that said first peg is guided only by said upper edge during part of the travel of said guide carriage. This reduces the overall vertical size of the mechanism which can be accommodated in the thickness of a standard sun-roof guide rail (30 mm, for example).

In a preferred variant of this preferred embodiment when said mobile panel is maximally tilted said first peg is disengaged from said first guide track and is located below a lower edge of said guide.

Said locking member is advantageously a lever rotatable about said first pivot pin and comprising a fourth guide track operating with a peg on said guide carriage, which peg may be attached to the second pivot pin. Said fourth guide track may have a downwardly curved rear part to raise said lever and a housing for locking said peg to prevent rotation of said guide carriage by setting the distance between said first and second pivot pins.

Said fourth guide track may be such that when said peg is released from its rear part said lever is housed in a lower cut-out of said rail so as to prevent any translatory movement of said mobile panel.

Other features and advantages of the invention will emerge from the following description given by way of non-limiting example with reference to the accompanying drawings.

BRIEF DESCRIPTION OF THE DRAWINGS

FIG. 1 is a side view in cross-section of a sun-roof in accordance with the invention in the closed position.

FIG. 2 shows part of a sun-roof in accordance with the invention including the locking lever in the position which locks the mobile panel against sliding.

FIG. 3 is a diagrammatic view of the sun-roof in the tilted position before sliding.

DETAILED DESCRIPTION OF THE INVENTION

Figure 4A:
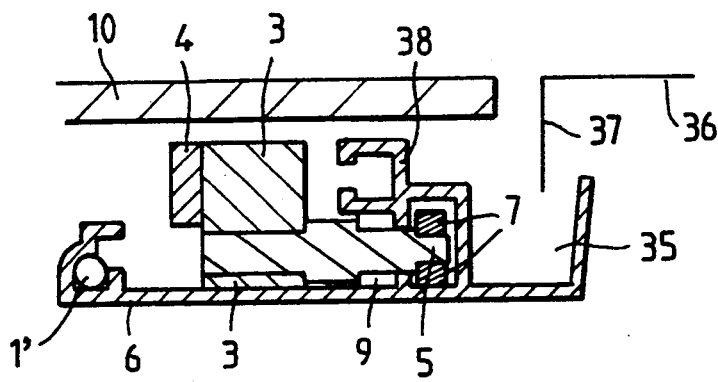
FIGS. 4a through 4d are views in transverse cross-section on the respective lines 4A—4A, 4B—4B, 4C—4C, and 4D—4D in FIGS. 1 and 2.
Figure 4B:
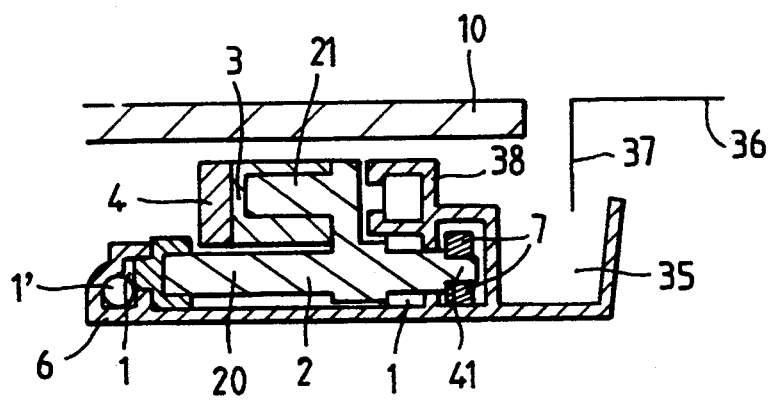
Figure 4C:
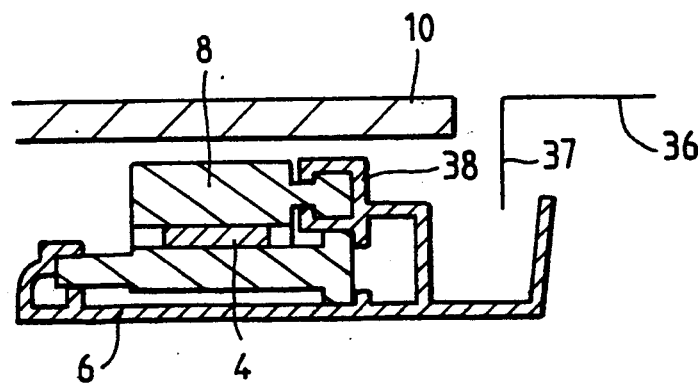
Figure 4D:
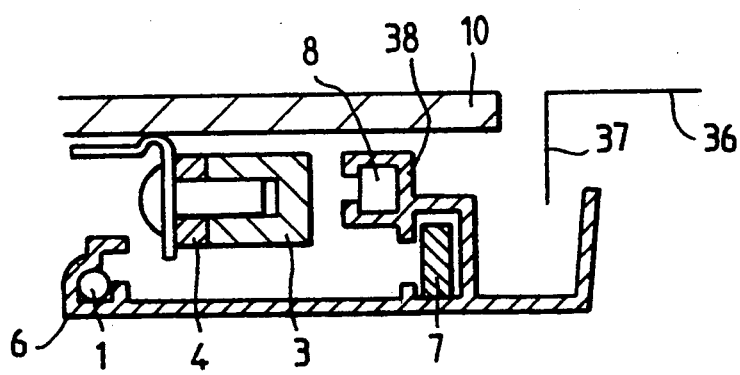

Referring to the figures, a sun-roof in the roof 36 of a vehicle comprises a mobile panel 10 comprising around its edge a seal identified by the reference numbers 11 at the front of the panel and 12 at its rear. The panel 10 is made of glass, for example, and is fixed to a slider 4 pivoted at the front by two pins 5 on opposite sides of the panel, each pin 5 being linked to a carriage 9 (FIG. 4a) sliding in a rail 6. The slider 4 is attached to two guides 3 made from plastics material, for example, on opposite sides of the mobile panel 10 and comprising three tracks 30, 31 and 32. The tracks, 30, 31 and 32 of each guide 3 cooperate with pegs 21, 22 and 23 on a link 2 forming a guide carriage. Each of the two guide carriages 2 is driven by a mechanism 1 including a rack cable 1' operated by a handle (not shown) in the known manner. The cable 1' is housed inside the rail 6 (see FIGS. 4a through 4d). All movements of the sun-roof are caused by movements communicated to the guide carriages 2 by displacement of the rack mechanism 1. Each guide carriage 2 comprises a pivot pin 20 housed in a central part of the rail 6 in such a way as to enable rotation of the part 2 irrespective of its position along the rail 6. The peg 21 is in the immediate vicinity of the pivot pin 20 and is above the latter when the panel 10 is in the closed position. It is accommodated in a guide track 32 of the guide 3. The guide track 32 is curved downwards in order to raise the panel 10 on rotation of the guide carriage 2 as it moves towards the rear of the roof 36. The, pegs 22, 23 are superposed at a rear part of the guide carriage 2, the upper peg 22 sliding in a guide track 31 which is substantially parallel to the rail 6 and the lower peg 23 sliding in a guide track 30 whose front part is curved slightly downwards until it meets and extends the guide track 32.

The rail 6 incorporates a lateral gutter 35 projecting beyond the edge 37 of the opening in the roof 36 and may also have a shaped region 38 adapted to receive a member 8 for holding the panel 10 in the closed position in the known manner, this sliding member 8 extending over virtually all the length of the sun-roof.

A lever 7 (FIG. 2) resting in a cut-out 39 in the lower part of the rail 6 when the panel is closed includes a guide track 40 cooperating with an extension 41 of the pin 20 and having a downwardly curved rear part 42 ending at a housing 45. This enables the lever 7 be lifted out of the cut-out 39 when the guide carriage 2 has finished pivoting. In the raised position the extension 41 is immobilized in the housing 45 so as to prevent rotation of the guide carriage 2 in the opposite direction when it is drawn towards the front by the cable system 1. A single lever 7 may be used but for preference a lever 7 is disposed at each side of the mobile panel 10.

The device operates in the following manner: in the closed position of the panel shown in FIG. 1 the pegs 21 and 22 on each carriage 2 are abutted against the front part of the respective grooves 32 and 31 and the peg 23 is in the front part of the guide track 30. By operating the cable mechanism 1 the guide carriages 2 are pulled towards the rear and the pegs 22 and 23 slide along the guide tracks 31 and 30. The peg 21 on each carriage 2 slides towards the rear of the guide track 32 which rotates the guide carriages 2 to raise the mobile panel 10 by rotating it about the two pins 5. During this rotation translatory movement of the mobile panel 10 is prevented by the immobilization of the lever 7 in the cut-out 39 in the rail 6. As shown in phantom lines in FIG. 2, when rotation of the guide carriages 2 is completed the lever 7 (or each lever 7 if there are two) is released from the cut-out 39 by virtue of cooperation between the finger 41 and the curved guide track portion 42 and the lever 7 is raised by rotation about the pin 5 to prevent rotation of the carriages 2 in the opposite direction. This locking action is obtained by virtue of the fact that the guide track 40 has the housing 45 at the lower end of its curved portion 42. This retains the peg 41 which fixes the distance between the pins 5 and 20. As the system 1 continues to be actuated towards the rear of the roof 36 the mobile panel 10 is moved in translation, remaining tilted, until it reaches a rear abutment. The mobile panel 10 is then open and in the tilted position above the roof 36 of the vehicle, as shown in FIG. 3.

When the mechanism 1 is actuated towards the front to close the mobile panel 10 the guide carriages 2 are entrained only in translation because their rotation is prevented by the lever 7 as explained above. This continues until the mobile panel 10 reaches the forward abutment position (11). At this time actuation of the guide carriages 2 by the mechanism 1 releases the finger 41 (an extension of pin 20) from the housing 45 and it slides along the curved portion 42 and then the straight portion 43 of the slot 40. As a result the lever 7 drops into the cut-out 39 in the rail 6 which prevents subsequent translatory movement of the mobile panel 10 as explained above. Further movement of the guide carriage 2 towards the front of the roof 36 rotates the carriage 2 in the opposite direction to close the mobile panel 10, so returning to the situation of FIG. 1.

The slots 32 and 30 in the lower part of the guide 3 do not have any lower edge where the travel of the peg 21 ends and the travel of the peg 23 begins. Because of this the height of the guide 3 can be reduced so that it can be accommodated inside the rail 6 and possibly, as shown in FIG. 3, enabling the peg 21 to descend below the lower part of the guide 3 when the guide carriage 2 is in the position in which the mobile panel 10 is tilted to the maximum. This minimizes the height of the guide 3.

There is claimed:

1. Tilt and slide sun-roof comprising:
    a mobile panel on each side of which is a first pivot pin, a rail, and a sliding member comprising a guide carriage and guide fastened to the mobile panel, each said sliding member being situated at a forward part of the mobile panel and movable in translation relative to said rail,
    said guide carriage having pegs cooperating with respective guide tracks in said guide, the guide carriage being movable a first distance of translation relative to said rail to tilt the mobile panel about the first pivot pin to a tilted vent position prior to sliding said panel rearward, by movement of the guide carriage a second distance towards the rear of the mobile panel and to slide the panel forward prior to a reverse tilting of the mobile panel on return movement of the guide carriage towards the front of the mobile panel,
    said guide carriage further including a second pivot pin about which said carriage is rotatable, said mobile panel being tilted to said vent position by rotating said guide carriage about said second pivot pin during translatory movement of said guide carriage said first distance towards the rear of said mobile panel, and means for preventing rotation of said guide carriage during return movement of said guide carriage towards the front of the mobile panel, wherein said rotation preventing means comprise on one side at least of said mobile panel a locking member operated by displacement of said guide carriage and having a first position preventing sliding of said mobile panel and a second position preventing rotation of said guide carriage, transition from said first to said second position occurring during translatory movement of said guide carriage towards the rear and substantially at an end of rotation of said guide carriage to tilt said mobile panel, and transition from said second position to said first position occurring during translatory, movement of said guide carriage towards the front and substantially at an end of the forward travel of said mobile panel.

2. Sun-roof according to claim 1 wherein after movement of said guide carriage said first distance rotates said guide carriage such that said mobile panel is tilted to said vent position, further translatory movement of the rotated guide carriage the second distance towards the rear of the mobile panel slides the tilted vent position mobile panel rearward to an open position above a vehicle roof.

3. Sun-roof according to claim 1 wherein a guide carriage comprises a first peg adjacent said second pivot pin and second and third pegs spaced from said second pivot pin, said guide has first, second and third guide tracks, said first peg cooperating with said first guide track which is curved to cause said rotation of said guide carriage and said second and third pegs cooperating with said second and third guide tracks the profile of which is adapted to tilt and close said mobile panel in conjunction with said rotation of said guide carriage.

4. Sun-roof according to claim 3 wherein said second guide track is situated above said third guide track.

5. Sun-roof according to claim 4 wherein said third guide track has a lower edge which extends forwardly over a distance less than an upper edge thereof so that said third peg is guided only by said upper edge during part of the travel of said guide carriage.

6. Sun-roof according to claim 3 wherein said first guide track has a lower edge extending rearwardly over a shorter distance than an upper edge thereof so that said first peg is guided only by said upper edge during part of the travel of said guide carriage.

7. Sun-roof according to claim 6 wherein, when said mobile panel is maximally tilted , said first peg is disengaged from said first guide track and is located below a lower edge of said guide.

8. Sun-roof according to claim 1 wherein said locking member is a lever rotatable about said first pivot pin and comprising a fourth guide track operating to guide one of said pegs on said guide carriage.

9. Sun-roof according to claim 8 wherein said fourth guide track has a downwardly curved rear part by which said lever is raised to said second position during travel of said peg along said curved rear part and a housing in which said peg is receivable to prevent rotation of said guide carriage by setting a distance between said first and second pivot pins.

10. Sun-roof according to claim 9 wherein said fourth guide track is such that when said peg is released from said rear part during movement of said peg forward said lever is lowered into a lower cut-out of said rail so as to prevent any translatory movement of said mobile panel.

11. Sun-roof according to claim 8 wherein said peg is attached to said second pivot pin.

* * * * *